Patented Feb. 24, 1948

2,436,659

UNITED STATES PATENT OFFICE 2,436,659

PROCESS OF MAKING d-SACCHARIC ACID

Charles L. Mehltretter, Peoria, Ill., assignor to the United States of America, as represented by the Secretary of Agriculture No Drawing. Application March 26, 1946, Serial No. 657,327

9 Claims. (Cl. 260—528)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to an improved and economical process for the production of d-saccharic acid. d-Saccharic acid is of importance for use in pharmaceutical compounds and preparations, as a food acid, in resins and plastics, and so forth, and its commercial production is therefore of value.

The preparation of d-saccharic acid by the nitric acid oxidation of carbohydrate material is known. Kiliani (Ber. 56, 2022 (1923)) claimed never to have obtained more than 18 percent potassium acid saccharate of theory by the nitric acid oxidation of d-glucose or starch up to that time. Berichte 58, 2345 (1925) discloses a preferred method of oxidation of rice starch by nitric acid by which was obtained a yield of 23–25 percent of the theoretical. In this process, 250 grams of rice starch were oxidized with 850 ml. of 20 percent nitric acid over a period of 35 hours and over a range of room temperature to boiling temperature.

Odell, in United States Patent 1,425,605 (August 15, 1922), discloses a process for the nitric acid oxidation of carbohydrates to organic acids such as tartaric, saccharic, and so forth, in the presence of metalliferous catalysts.

I have found, however, that d-glucose can be oxidized with nitric acid so that higher yields of saccharic acid are obtained than heretofore, more conveniently, in a shorter period of time, and preferably without the use of metal oxidation catalysts. In fact, the use of the common metal oxidation catalysts, such as vanadic and molybdic acid salts, lowers the yields of saccharic acid obtained.

In the preferred process, crystalline d-glucose, in the anhydrous or monohydrate form, is added to a solution of nitric acid of 50 to 70 percent concentration at a rate which will allow control of the temperature of the solution to 55° to 90° C. When 60 to 70 percent nitric acid is used, it is preferred to use reaction temperatures of 55° to 70° C. When lower concentrations of nitric acid are employed, higher reaction temperatures are generally preferred. Agitation and/or cooling are desirable in order to allow more rapid addition of the glucose and thereby to shorten the time of reaction. When conducted in this way, the reaction is quite rapid and smooth, with nearly maximum yields of saccharic acid being obtained in a one-hour period of oxidation.

Cooling by vacuum evaporation has also been used satisfactorily as a means of temperature control during the reaction.

In the absence of external cooling, slower addition of the glucose with attendant longer periods of oxidation is desirable in order to maintain the desired reaction temperature.

The invention is not limited to the use of crystalline d-glucose. Concentrated d-glucose sirups and the so-called "70" and "80" corn sugars of commerce are also satisfactory sources of carbohydrate for this process. Also, higher concentrations of nitric acid than 70 percent may be used.

It is preferred to use a mole ratio of glucose to nitric acid of 1 to 4, although the invention is not limited to this proportion. A mole ratio of glucose to nitric acid of 1 to 3 lowers the yield of saccharic acid, while a ratio of 1 to 8 increases the yield.

When the oxidation reaction is finished, the liquor is neutralized to pH of 8, or higher, with a concentrated solution of potassium hydroxide or carbonate. The slightly alkaline solution is allowed to stand for a short time to insure complete conversion of saccharolactone present to soluble neutral potassium saccharate. Nitric acid, or other mineral acids, are then introduced to adjust the pH of the oxidation liquor to 3.4 to 3.6 when potassium acid saccharate will crystallize out of solution almost immediately. After standing overnight at room temperature, the potassium acid saccharate is filtered or centrifuged and washed with 30 percent ethyl alcohol or cold water. It is easily dried and is of 97 to 100 percent purity.

Evaporation of the filtrate at 60° C. and subatmospheric pressure to a sufficiently small volume results in the crystallization of potassium nitrate. This compound can be recovered by filtration in fairly pure form. The potassium nitrate filtrate may be returned to the next oxidation run where it is introduced into the nitric acid solution with more glucose. The reactions are advantageously carried out in the presence of small amounts of nitrous acid which is usually present in nitric acid. The addition of very small quantities of sodium or potassium nitrite will produce sufficient nitrous acid instantaneously.

The process may be carried out continuously by allowing such an amount of nitric acid and glucose to flow into the reaction vessel that the most favorable concentration of acid is maintained. The nitrogen oxide gases emerging from the reaction vessel may be obsorbed by known methods and the nitric acid produced recovered for further use.

If it is desired to recover the small amount of oxalic acid formed during the oxidation reaction, it may be removed before or after the removal of potassium acid saccharate by the addition of the calculated amount of calcium carbonate or hydroxide, or soluble calcium salts at pH 1 or higher, but preferably at pH 3.2.

Under the conditions specified in Example 1, oxalic acid dihydrate is formed to the extent of 3.3 percent of the amount of glucose used. More oxalic acid can be produced by oxidizing for longer periods of time after the initial reaction of glucose at 60° to 65° C. The yield of saccharic acid is not appreciably affected by this procedure when the mole ratio of glucose to nitric acid is 1 to 4.

The following examples serve to illustrate the more detailed practice of the invention, but the invention is not restricted to the said examples:

Example I 90 grams of commercial anhydrous d-glucose were slowly added in small portions, while stirring, to 128 ml. of 70 percent nitric acid which had previously been heated at 60° C. and to which 0.1 gram sodium nitrite had been added. The temperature was maintained at 60° to 65° C. by external cooling and appropriately proportioning the addition of the glucose. All of the glucose was introduced into the nitric acid solution in 20 minutes and the reaction allowed to continue for one hour. The mixture was then cooled to room temperature, and strong potassium hydroxide solution was slowly added with cooling and stirring to obtain pH 9.6 and a temperature of about 80° C. After cooling to room temperature, 70 percent nitric acid was introduced to adjust the pH of the solution to 3.4. The mixture was allowed to stand overnight, and the crystalline potassium acid saccharate was filtered from the mother liquor, washed with cold water, and dried. The yield of potassium acid saccharate thus obtained was 54.6 grams of 97.4 percent purity, or 43 percent of the theoretical. The yield of oxalic acid dihyhrate was 3.3 percent of the weight of glucose used. A repetition of Example I, but allowing the oxidation reaction to proceed at 60° to 65° C. for 2 hours, gave a yield of potassium acid saccharate of 43.2 percent of theory and oxalic acid dihydrate to the extent of 4.8 percent of the weight of glucose used.

Example II 96.5 grams of commercial d-glucose monohydrate (93.2 percent glucose) were slowly added, with agitation, to 148 ml. of 61 percent technical nitric acid which had previously been heated to 60° C. and to which 0.1 gram of potassium nitrite had been added. The temperature of the reaction mixture was kept at 60° to 65° C. by external cooling during the addition of all of the glucose over a 15-minute period. The solution was stirred 45 minutes more at a temperature of 60° to 65° C. The reaction mixture was immediately cooled to room temperature and concentrated potassium hydroxide solution added to obtain pH 9, at a temperature of about 80° C. After cooling the mixture to 15° C., 61 percent nitric acid was introduced with stirring until pH 3.4 was achieved.

The solution was cooled to room temperature overnight, and the crystalline potassium acid saccharate was filtered from the mother liquor, washed with cold water, and dried. The yield of potassium acid saccharate obtained by separating the crystals thereof precipitated in the foregoing reaction mixture was 54 grams of 98.5 percent purity, or 42.8 percent of theory. The potassium acid saccharate mother liquor and washings (pH 3.4) were combined and analyzed for oxalic acid content. The main solution was heated to 70° C., and the calculated amount of calcium chloride was added to precipitate the oxalic acid as calcium oxalate at a pH of 3.2. The yield of oxalic acid dihydrate calculated from the calcium oxalate obtained was 3 percent of the weight of glucose used.

Example III 45 grams of anhydrous d-glucose were added in small portions, with stirring, to 94.5 ml. of 50 percent nitric acid at an initial temperature of 70° C. 0.1 gram sodium nitrite was introduced previous to the addition of the glucose. The temperature of the reaction mixture was maintained at 70° to 75° C. with external cooling for 20 minutes, at the end of which time all of the glucose had been added. The cooling was then discontinued and the mixture heated to 90° C. over a 30-minute period. The mixture was cooled to room temperature, and concentrated potassium hydroxide solution was added until pH 9.5 was reached. After 15 minutes, concentrated nitric acid was slowly added to the liquor to obtain pH 3.4. Crystallization of potassium acid saccharate began immediately, and the mixture was allowed to reach room temperature overnight. The precipitated potassium acid saccharate was filtered from the mother liquor, washed with 30 percent ethyl alcohol, and dried. Potassium acid saccharate obtained amounted to 23.7 grams of 99.4 percent purity, which corresponds to a yield of 37.9 percent of the theoretical. A potassium analysis gave 15.37 percent (theory 15.75 percent).

Example IV 128 ml. of 70 percent nitric acid to which 0.1 gram sodium nitrite had been added were heated to 58° C., and 99 grams of d-glucose monohydrate was introduced in small portions over a 35-minute interval. The temperature of the reaction was controlled at 58° to 60° C. by external cooling and agitation of the mixture. Cooling was discontinued after this time interval, and the temperature of the reaction mixture was allowed to rise to 90° C. through its own heat of reaction over a 30-minute period. The oxidation liquor was immediately cooled to room temperature, and concentrated potassium hydroxide solution was added until pH 10 was obtained. After standing 30 minutes, strong nitric acid was added with stirring until pH 3.5 was reached. The reaction mixture was cooled to room temperature overnight and the crystalline potassium acid saccharate precipitate was filtered and washed with 30 percent ethyl alcohol. The dried potassium acid saccharate weighed 48.6 grams and was 98.5 percent pure. The yield was calculated to be 38.5 percent of the theoretical. A potassium assay gave 15.38 percent (theory 15.75 percent).

Example V 45 grams of anhydrous d-glucose were added in portions to 96 ml. of 70 percent nitric acid maintained at a temperature of 58° to 60° C. by external cooling and stirring. All of the glucose was added in 15 minutes, and the whole was stirred at 58° to 60° C. for 30 minutes more. The reaction mixture was immediately cooled to room temperature, and potassium hydroxide solution was added to give a pH of 11.0. Nitric acid was added after 30 minutes to pH 3.4. The reaction mixture was cooled to room temperature overnight, when the crystalline potassium acid saccharate precipitate was filtered and washed with 30 percent ethyl alcohol. The dried product weighed 28.8 grams and had a purity of 98.4 percent. The yield was calculated to be 45.7 percent of theory. Analysis showed 15.58 percent potassium to be present (theory 15.75 percent).

*Example VI*

45 grams of anhydrous d-glucose were added to 80 ml. of 70 percent nitric acid at 55° to 60° C., and the mixture was worked up as in Example V. The yield of potassium acid saccharate was 41 percent.

*Example VII*

131.5 grams of "70" sugar (68.5 percent glucose) were added in small portions, with stirring, to 148 ml. of technical 61 percent nitric acid at an initial temperature of 60° C. 0.1 gram of sodium nitrite was introduced previous to the addition of glucose. All of the sugar was added in 20 minutes, and the reaction temperature was maintained at 60° to 65° C. for 4 hours with external cooling and stirring. The solution was cooled to room temperature, and strong potassium hydroxide solution was slowly added to obtain a pH of 9 and a temperature of about 80° C. After cooling to room temperature, 61 percent nitric acid was added to obtain a pH of the solution of 3.4. The precipitated potassium acid saccharate was allowed to stand overnight at room temperature, and the product was removed from the mother liquor by filtration, washed with cold water, and dried. The yield of potassium acid saccharate thus obtained was 46 grams of 98.0 percent purity or 38 percent of theory.

*Example VIII*

A glucose sirup, made by dissolving 45 grams of anhydrous glucose in 46 grams of water, was slowly added to 80 ml. of 70 percent nitric acid at 55° to 60° C. All of the sirup was introduced over a half-hour period and the temperature was then allowed to rise spontaneously to 90° C. over another half-hour interval. The potassium acid saccharate was isolated in the usual way and was obtained in a yield of 38 percent of theory. The yield of oxalic acid dihydrate (isolated as calcium oxalate) was 4 percent of the weight of glucose used.

Mole ratios of 1 to 8 (glucose to nitric acid) with 50 percent acid at 70° to 75° C. and 70 percent nitric acid at 55° to 60° C., reacted over one-hour periods, gave yields of potassium acid saccharate of 43.6 and 44.6 percent, respectively. A mole ratio of 1 to 3 of glucose to 70 percent nitric acid at 55° to 60° C., reacted for 1½ hours, gave only 31 percent potassium acid saccharate.

Having thus described my invention, I claim:

1. A process for producing d-saccharic acid comprising gradually adding d-glucose to nitric acid, maintaining the temperature during the addition at 55° to 90° C., the ratio of nitric acid to glucose in the reaction mixture being about 3 to 8 moles of nitric acid per mole of glucose, the nitric acid concentration in the reaction mixture being about 50 to 70 percent, the process being carried out in the absence of metallic compound oxidation catalysts, and recovering d-saccharic acid from the reaction mixture.

2. The process recited in claim 1 in which the d-glucose is crystalline d-glucose.

3. The process recited in claim 1 in which the mole ratio of d-glucose to nitric acid is 1 to 8.

4. The process recited in claim 1 in which the nitric acid is pre-heated and the d-glucose is added in increments over a period of about 15 to 35 minutes.

5. The process recited in claim 1 in which the temperature is maintained at below 70° C. during the addition of glucose, and thereafter raised above 70° C.

6. A process for producing d-saccharic acid comprising gradually adding portions of d-glucose to nitric acid, maintaining the temperature during the addition at 55° to 90° C., the ratio of nitric acid to glucose in the reaction mixture being 3 to 8 moles of nitric acid per mole of glucose, the nitric acid concentration being 50 to 70 percent, and recovering d-saccharic acid from the reaction mixture.

7. The process of claim 6 in which the temperature is maintained at 55° to 75° C. during the addition of glucose and thereafter maintained at 75° to 90° C.

8. The process of claim 7 in which the glucose is gradually added over a period of at least 15 minutes.

9. The process described in claim 1 in which the temperature of the reaction is maintained at 60° to 65° C.

CHARLES L. MEHLTRETTER.

REFERENCES CITED

The following references are of record in the file of this patent:

UNITED STATES PATENTS

| Number | Name | Date |
|---|---|---|
| 1,425,605 | Odell | Aug. 15, 1922 |
| 2,380,196 | Soltzberg | July 10, 1945 |
| 2,382,288 | Braun | Aug. 14, 1945 |

FOREIGN PATENTS

| Number | Country | Date |
|---|---|---|
| 108,494 | Great Britain | Sept. 9, 1920 |

OTHER REFERENCES

Kiliani, Ann. Der. Chemie, vol. 205, page 172 (1880).